US006600595B2

(12) United States Patent
Aida et al.

(10) Patent No.: US 6,600,595 B2
(45) Date of Patent: Jul. 29, 2003

(54) MULTI-STAGE OPTICAL AMPLIFIER APPARATUS HAVING FIBER GRATING WITH A CUTOFF WAVELENGTH LESS THAN THE PUMP LIGHT WAVELENGTH

(75) Inventors: Ryuji Aida, Tokyo (JP); Kenichi Yoneyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/781,281

(22) Filed: Feb. 13, 2001

(65) Prior Publication Data

US 2001/0013970 A1 Aug. 16, 2001

(30) Foreign Application Priority Data

Feb. 16, 2000 (JP) ....................................... 2000-038428

(51) Int. Cl.$^7$ ............................................... H04B 10/12
(52) U.S. Cl. .................................. 359/341.3; 359/337.1
(58) Field of Search ........................ 359/341.3, 341.41, 359/341.42, 337.1, 341.4

(56) References Cited

U.S. PATENT DOCUMENTS

| | | | |
|---|---|---|---|
| 5,115,338 A | | 5/1992 | DiGiovanni et al. |
| 5,430,572 A | * | 7/1995 | DiGiovanni et al. ........ 359/337 |
| 5,521,753 A | * | 5/1996 | Fake et al. ............. 359/341.32 |
| 5,640,268 A | * | 6/1997 | Chesnoy ................. 359/341.33 |
| 5,995,275 A | * | 11/1999 | Sugaya ....................... 359/160 |
| 6,288,834 B1 | | 9/2001 | Sugaya et al. ........... 359/341.1 |
| 6,333,810 B1 | * | 12/2001 | Yoon et al. ............. 359/341.32 |
| 6,335,820 B1 | * | 1/2002 | Islam ......................... 359/334 |
| 6,339,494 B1 | * | 1/2002 | Hwang et al. ........... 359/337.1 |
| 6,388,800 B1 | * | 5/2002 | Christodoulides et al. .. 359/334 |

FOREIGN PATENT DOCUMENTS

| | | |
|---|---|---|
| JP | 7-301831 | 11/1995 |
| JP | 9-297233 | 11/1997 |
| JP | 11-103113 | 4/1999 |
| JP | 11-344620 | 12/1999 |
| JP | 2000-13327 | 1/2000 |
| WO | WO 99/50978 | 10/1999 |

OTHER PUBLICATIONS

Becker, P.C. et al. "Erbium–Doped Fiber Amplifiers: Fundamentals and Technology." Academic Press, 1999. pp. 251–319.*

(List continued on next page.)

Primary Examiner—Thomas G. Black
Assistant Examiner—Andrew R. Sommer
(74) Attorney, Agent, or Firm—McGinn & Gibb, PLLC

(57) ABSTRACT

An optical amplifier apparatus according to the invention is provided with a pumping light source that outputs pumping light for pumping first and second optical amplifying media. Therefore an input signal light is amplified by the first and second optical amplifying media mutually connected in series and a wavelength division multiplexing coupler that inputs the pumping light to both optical amplifying media and adopts configuration that an optical equalizer is arranged between the first and second optical amplifying media. Therefore, as pumping light passes the optical equalizer and pumps the two optical amplifying media by arranging the optical equalizer between both optical amplifying media, the optical amplifying medium after the optical equalizer amplifies, the loss of the optical equalizer is compensated and the optical amplification of high output is acquired. That is, as pumping light output from the pumping light source passes the fiber grating optical equalizer, the two optical amplifying media can be efficiently pumped and simultaneously, the latter optical amplifying medium compensates the loss of the optical equalizer. In addition, pumping light can be stably propagated without mode transformation when the pumping light passes the optical equalizer and a stable pumped state can be also maintained by composing the optical equalizer by a grating fiber optical equalizer having a cutoff wavelength shorter than the wavelength of the pumping light.

9 Claims, 3 Drawing Sheets

OTHER PUBLICATIONS

Zyskind, J.L et al. "Optimal Pump Wavelength in the 4l15/2–4l13/2 Absorption Band for Efficient Er3+–Doped Fiber Amplifiers." IEEE Photonics Tech. Lett. 1:12. Dec. 1989.*

Ali, M.A. et al. "980–nm versus 1480–nm pumped EDFA Cascade Performance in WDM Multiple Access Lightwave Networks." Lasers and Electro–Optics Society Annual Meeting, 1995. 8th Annual Meeting Conference Proceedings, vol. 1. pp. 198, 199.*

European Search Report dated Jul. 5, 2001.

Japanese Office Action dated Sep. 24, 2002 with partial translation.

* cited by examiner

MULTI-STAGE OPTICAL AMPLIFIER APPARATUS HAVING FIBER GRATING WITH A CUTOFF WAVELENGTH LESS THAN THE PUMP LIGHT WAVELENGTH

BACKGROUND OF THE INVENTION

1. Field of the Invention

The present invention relates to an optical amplifier apparatus, particularly relates to an optical amplifier apparatus that can amplify optically with low pumping power to be high output in a broadband.

2. Description of the Related Art

A wavelength division multiplexing optical transmission system in which signal lights of different plural wavelengths are multiplexed and transmitted is widely used to increase transmission capacity. A batch of optical amplification by an optical amplifier apparatus is also demanded for a signal light (a wavelength multiplexed signal light) acquired by multiplexing such plural signal lights of different wavelengths are multiplexed.

In a conventional type optical amplifier apparatus, an optical equalizer is arranged on the output side of an optical amplifier. The optical equalizer for equalizing the gain of a signal light after optical amplification is finished is arranged. As a result, a problem that the optical output power is reduced by the loss of the optical equalizer and a predetermined output level of a signal light amplified by the optical amplifier apparatus is not acquired is caused.

The optical output power of the optical amplifier is deteriorated by the insertion (the arrangement) of the optical equalizer for a signal light after optical amplification is finished. Therefore, to acquire required optical output power, the power of pumping light from a pumping light source is required to be increased and a demand for the power of pumping light from the pumping light source escalates. The demand has a problem in terms of consumed power, the generation of heat, the life of the pumping light source and others.

3. Summary of the Invention

The object of the invention is to realize an optical amplifier apparatus that can equalize the gain in a broad wavelength band with high precision and can correspond to high output and the reduction of consumed power. Incidentally, the object is to enhance the mounting efficiency of optical components in an optical repeater for which high-density mounting is demanded such as an optical transmitter-receiver, an optical repeater and a submarine optical repeater.

An optical amplifier apparatus according to the invention is provided with a first optical amplifying medium that amplifies an input signal light and outputs a first amplified signal light, a second optical amplifying medium connected to the first optical amplifying medium in series for amplifying the input first amplified signal light and outputting a second amplified signal light and an optical wavelength division multiplexing (WDM) coupler arranged on either side of the side to which a signal light is input of the first optical amplifying medium or the side from which a second optical amplified signal light is output of the second optical amplifying medium for inputting pumping light to the first optical amplifying medium or the second optical amplifying medium. In the configuration described above, an optical equalizer arranged between the first optical amplifying medium and the second optical amplifying medium is provided. The invention is provided with two pumping light sources in the configuration. The two WDM couplers for inputting pumping light respectively output from these pumping light sources to the first and second optical amplifying media are provided. The WDM couplers are composed of a first WDM coupler that is arranged on the side to which a signal light is input of the first optical amplifying medium and inputs first pumping light to the first optical amplifying medium and a second WDM coupler that is arranged on the side from which a second amplified signal light is output of the second optical amplifying medium and inputs second pumping light to the second optical amplifying medium.

The optical equalizer has the dependency upon a wavelength of loss that compensates the dependency upon a wavelength of gain generated when a signal light is amplified by the first and second optical amplifying media. The optical equalizer is characterized in that it is composed by a fiber grating optical equalizer provided with a cutoff wavelength shorter than the wavelength band of pumping light. For example, in case the first and second optical amplifying media are both an erbium-doped fiber, pumping light has a wavelength of 0.98 $\mu$m and the optical equalizer can be composed of a fiber grating optical equalizer the cutoff wavelength of which is 0.97 $\mu$m or less. The cutoff wavelength of the optical fiber composing a fiber grating is set to 0.97 $\mu$m for pumping light having a wavelength of 0.98 $\mu$m, however, the cutoff wavelength has only to be a wavelength at which no mode transformation is caused.

The optical amplifier apparatus according to the invention is characterized in that it is provided with a gain control circuit that controls the output of pumping light so that the gain of a second amplified signal light for a signal light is a predetermined value in addition to the configuration described above.

According to the invention, pumping light passes the optical equalizer and pumps the two optical amplifying media by arranging the optical equalizer between the two optical amplifying media. Hereby, as the optical amplifying medium after the optical equalizer amplifies and compensates the loss of the optical equalizer, the optical amplification of high output is acquired.

The mode of pumping light is prevented from being transformed when the pumping light passes the fiber grating optical equalizer by using an optical fiber the cutoff wavelength of which is shorter than the wavelength of pumping light for the optical fiber composing the fiber grating optical equalizer. Concretely, in case an erbium-doped fiber is used for the optical amplifying medium to amplify a signal light having a wavelength of 1.55 $\mu$m for example, pumping light having a wavelength of 0.98 $\mu$m can be stably propagated without the mode being transformed when the pumping light passes the fiber grating optical equalizer by using pumping light having a wavelength of 0.98 $\mu$m and setting the cutoff wavelength of the optical fiber composing the fiber grating optical equalizer to 0.97 $\mu$m or less and a stable pumped state is maintained. With the result that the stable pumped state is maintained, the optical amplifier apparatus in which optical output power is stable can be realized.

BRIEF DESCRIPTION OF THE DRAWINGS

The above and other objects, features and advantages of the present invention will become more apparent from the following detailed description when taken in conjunction with the accompanying drawing wherein.

DETAILED DESCRIPTION OF THE PREFERRED EMBODIMENTS

First, a conventional type optical amplifier apparatus will be described to facilitate the understanding of the invention before an optical amplifier apparatus according to the invention is described.

Figure 1:
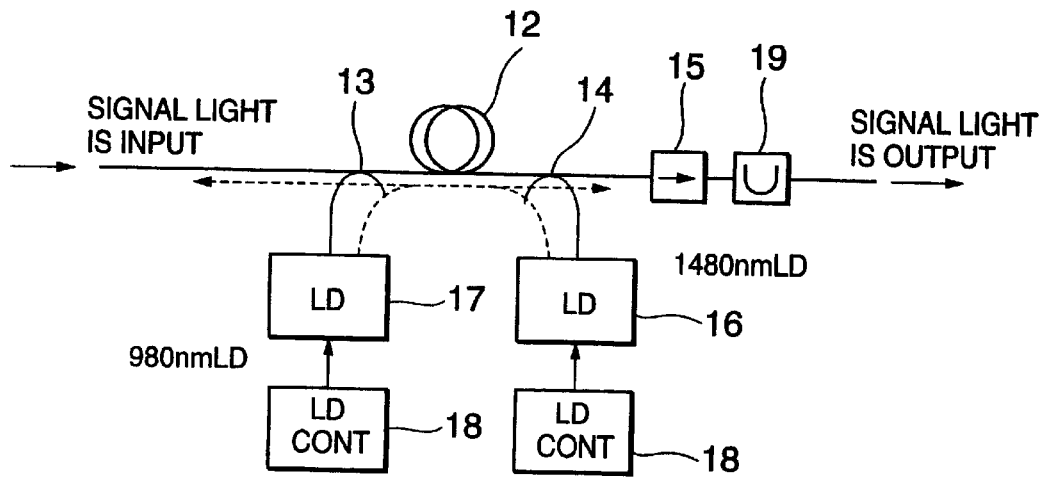
FIG. 1 shows the configuration of a conventional type optical amplifier.

FIG. 1 shows an example of a conventional type optical amplifier apparatus. The conventional type optical amplifier apparatus is provided with an optical amplifying medium 12 that amplifies a signal light input from a transmission line (for example, in the case of a signal light of the wavelength of 1.55 $\mu$m, a fiber into which erbium is doped is used), pumping light sources 16 and 17 that output pumping light, wavelength multiplexing couplers 13 and 14 that input pumping light respectively output from these pumping light sources to the optical amplifying medium, an optical isolator 15 for preventing reflected light from returning to the optical amplifying medium and pumping light source control circuits 18. An optical equalizer 19 that equalizes gain is arranged on the output side of the optical amplifying medium 12. In FIG. 1, a bi-directional pumping type that pumping light is incident both before and after the optical amplifying medium is shown, however, the conventional type invention is not limited to this type and is also applied to a forward pumping type that pumping light is incident before the optical amplifying medium or a backward pumping type that pumping light is incident after the medium.

An input signal light is amplified by the optical amplifying medium and output, however, at this time, the output level of an output amplified signal light is not flat because of the dependency upon a wavelength of gain which the optical amplifying medium 12 has. The gain wavelength characteristic of the optical amplifier apparatus is compensated for signal lights having difference in an output level by the optical equalizer 19, a flat gain wavelength characteristic is acquired and as a result, an amplified signal light at a flattened output level is transmitted.

In the conventional type optical amplifier apparatus described above, the optical equalizer is arranged on the output side of the optical amplifier. As the optical equalizer for equalizing the gain of a signal light after the optical amplification is finished is arranged, there is a problem that the optical output power is reduced by the loss of the optical equalizer and for a signal light after the optical amplification, a predetermined output level is not acquired.

As the optical output power of the optical amplifier is deteriorated by the insertion of the optical equalizer in the arrangement described above, the pumping light power of the pumping light source is required to be increased to acquire required optical output power. With the result that a demand for the power of pumping light from the pumping light source escalates, a problem such as the increase of consumed power, the generation of heat and the life of the pumping light source is caused.

Figure 2:
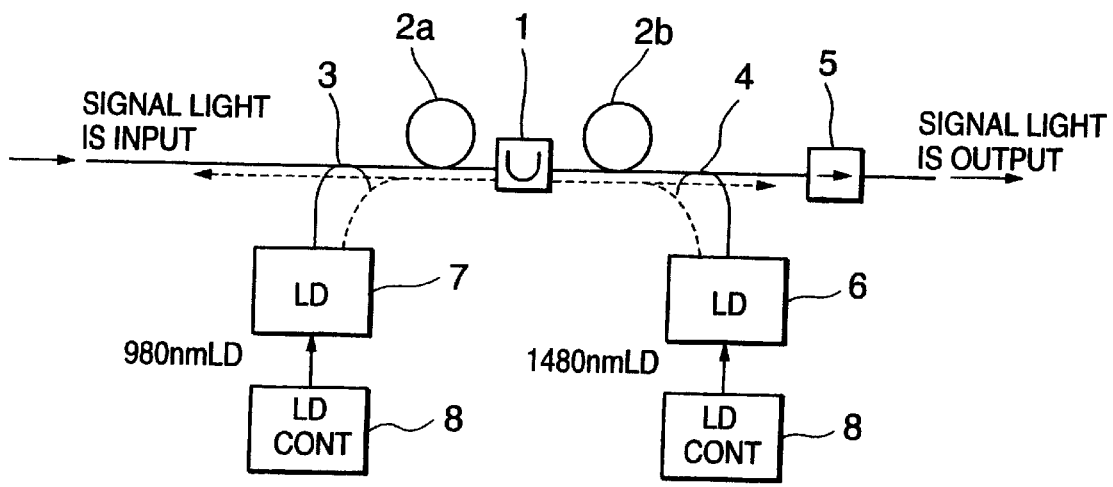
FIG. 2 shows the configuration of a first embodiment of an optical amplifier apparatus according to the invention.

FIG. 2 shows the configuration of a first embodiment of an optical amplifier apparatus according to the invention. The optical amplifier apparatus according to the invention is provided with two optical amplifying media 2a and 2b that amplify an input signal light and these optical amplifying media are connected in series. Two pumping light sources 6 and 7 are provided to input pumping light to these both optical amplifying media 2a and 2b. Pumping light output from each pumping light source 6, 7 is respectively input to both optical amplifying media 2a and 2b by a wavelength multiplexing coupler 3 arranged on the input side of the former optical amplifying medium 2a and a wavelength multiplexing coupler 4 arranged on the output side of the latter optical amplifying medium 2b. The optical amplifying media 2a and 2b become a pumped state by the pumping light, a signal light input from the left side in FIG. 2 is amplified and is transmitted to an optical transmission line on the right side as an amplified signal light. An optical isolator 5 is arranged on the output side of the second optical amplifying medium 2b to prevent reflected light from the optical transmission line from being input to the optical amplifier apparatus again. Further, a laser driving circuit (a gain control circuit) 8 that injects predetermined current to the semiconductor laser diode and controls the output power of pumping light is connected to each pumping light source 6, 7.

The optical amplifier apparatus according to the invention is characterized in that an optical equalizer 1 is arranged between the two optical amplifying media 2a and 2b as described above. Pumping light passes the optical equalizer and pumps the two optical amplifying media by arranging the optical equalizer 1 between the two optical amplifying media 2a and 2b. Therefore, as the optical amplifying medium 2b after the optical equalizer 1 functions for optical amplification and loss caused by the optical equalizer 1 is compensated, the optical amplification of high output is realized. The optical equalizer 1 has the dependency upon a wavelength of loss that compensates the dependency upon a wavelength of gain caused when a signal light is amplified by the first and second optical amplifying media.

In this embodiment, the optical amplification of a signal light having a wavelength of 1.55 $\mu$m is supposed and a fiber into which erbium is doped is used for the first and second optical amplifying media. A light source for outputting pumping light having a wavelength of 0.98 $\mu$m is used for the former pumping light source 3 and a light source for outputting pumping light having a wavelength of 1.48 $\mu$m is used for the latter pumping light source 4.

In the meantime, a fiber grating optical equalizer composed of an optical fiber the cutoff wavelength of which is 0.97 $\mu$m or less is used for the optical equalizer. A 0.98-$\mu$m pumping light source is used for at least one of the pumping light sources 6 and 7 for pumping the optical amplifying media 2a and 2b. The reason for the configuration described above is that the mode of pumping light from the 0.98-$\mu$m pumping light source is prevented from being transformed when the pumping light passes the fiber grating optical equalizer and the pumping light is stably propagated by setting the cutoff wavelength of the optical fiber composing the fiber grating optical equalizer 1 to 0.97 $\mu$m or less. Hereby, the maintenance of a stable pumped state is enabled and optical amplification in which optical output power is stable can be realized.

The cutoff wavelength of the optical fiber composing a fiber grating is set to 0.97 $\mu$m for pumping light having a wavelength of 0.98 μm, however, it has only to be set to a wavelength that causes no mode transformation as described above. A grating fiber is acquired by periodically varying the refractive index of the core of an optical fiber, only light having a specific wavelength is periodically reflected with predetermined reflectance and light having the other wavelength can be transmitted as it is. Then, a part in which a signal light of each wavelength included in a wavelength division multiplexed signal light is reflected is provided in series and the reflectance of each signal light can be set to a predetermined value, that is, gain equalizing action can be realized by setting high reflectance to a signal light high in an optical output level or gain and setting low reflectance to a signal light low in an optical output level or gain.

Needless to say, the optical amplifier apparatus according to the invention can be widely applied by using the optical amplifying media equivalent to the wavelength of an input signal light and the pumping light source for outputting pumping light having a predetermined wavelength without limiting the wavelength of a signal light to 1.55 μm if only the optical amplifier apparatus according to the invention has the basic configuration described above and below.

Next, the operation of the optical amplifier apparatus in this embodiment will be described more detailedly.

The laser driving circuit 8 shown in FIG. 2 controls the driving current of the pumping light sources 6 and 7 and pumping light is output from the pumping light sources. Pumping light respectively output from the pumping light sources 6 and 7 is input to the erbium (Er)-doped fibers 2a and 2b which are the optical amplifying media by the wavelength division multiplexing couplers 3 and 4, hereby, the erbium-doped fibers become a pumped state and amplify an input signal light.

A wavelength division multiplexed signal light input to this optical amplifier apparatus is amplified by stimulated emission when the signal light passes the pumped former optical amplifying medium 2a and a gain profile is compensated by the fiber grating optical equalizer 1. The amplified signal light is further amplified by passing the optical amplifying medium 2b. The amplified wavelength division multiplexed signal light passes the optical isolator 5 and is transmitted to the transmission line.

In this embodiment, as the pumping light source 6 is a pumping light source having a wavelength of 0.98 μm and the cutoff wavelength of the fiber grating optical equalizer 1 is set to 0.97 μm or less, pumping light having a wavelength of 0.98 μm can be stably propagated without mode transformation. Hereby, a stable pumped state can be maintained and the optical amplifier apparatus in which the optical output power is stable can be realized. In this embodiment, pumping light output from the former pumping light source has a wavelength of 0.98 μm, however, such a pumping light source may be also arranged back and both pumping light sources may also have a wavelength of 0.98 μm. Pumping light output from both pumping light sources may also have a wavelength of 1.48 μm and the cutoff wavelength of the optical fiber of the fiber grating optical equalizer 1 may be also shorter than this.

Though a gain control circuit is not shown in FIG. 2, the laser driving circuit 8 may be also provided with the gain control circuit that detects the output optical level of a signal light input to the optical amplifier apparatus and the amplified signal light, calculates the gain of optical amplification and controls so that this is a predetermined value. Or the laser driving circuit 8 may be also provided with an output control circuit that controls so that the output optical level of the amplified signal light is a predetermined value.

Next, a result of comparing each characteristic of the optical amplifier apparatus according to the invention and the conventional type optical amplifier apparatus will be described.

Figure 5:
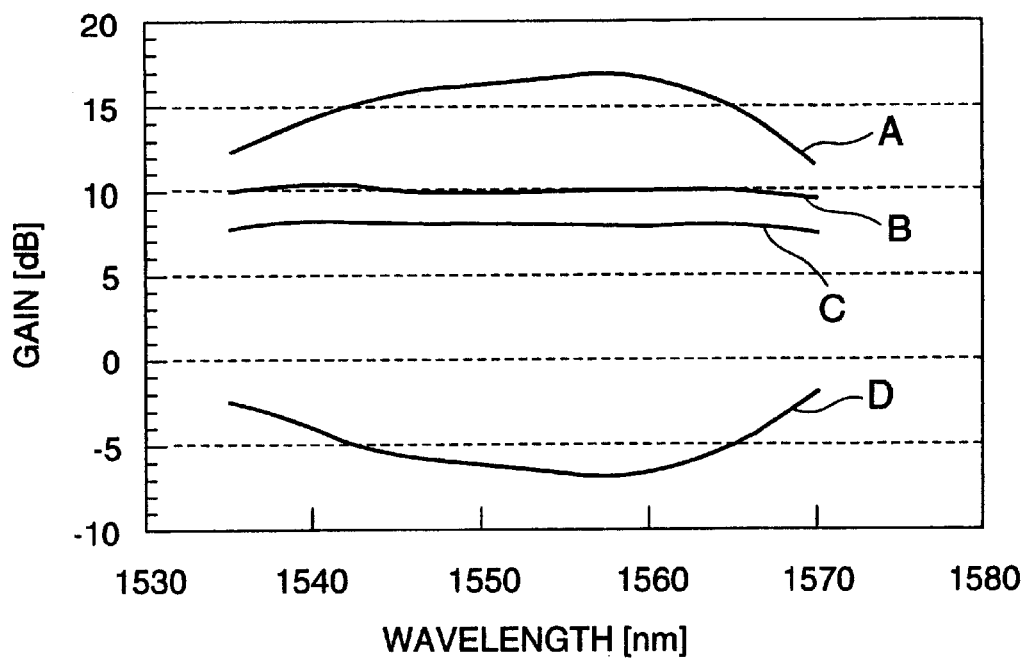
FIG. 5 shows the configuration of a fourth embodiment of the optical amplifier apparatus according to the invention (comparison with the conventional type optical amplifier apparatus)
Figure 6:
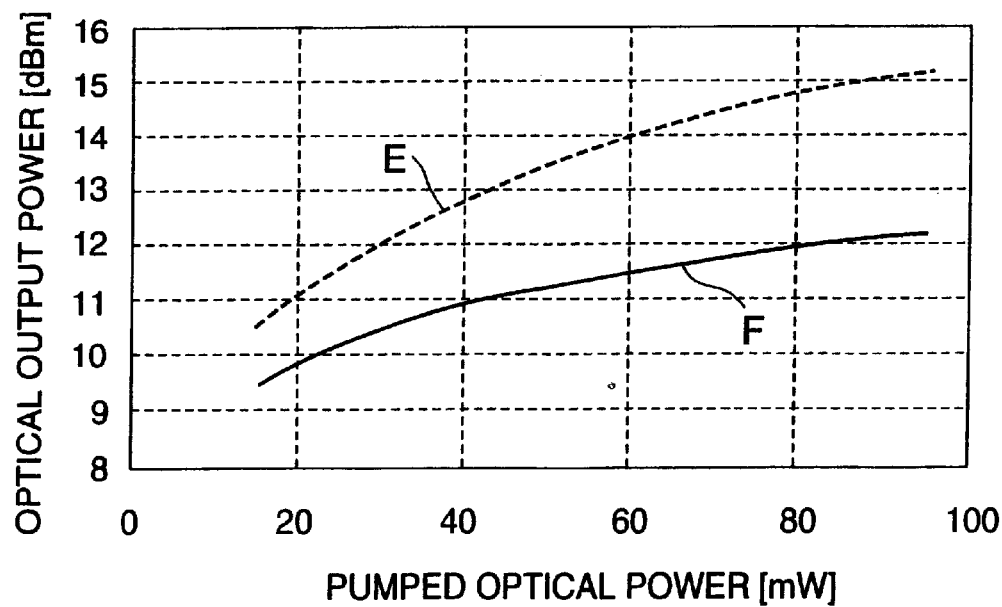
FIG. 6 shows the configuration of a fifth embodiment of the optical amplifier apparatus according to the invention.

FIGS. 5 and 6 show a result of comparing each characteristic of the optical amplifier apparatus according to the invention and the conventional type optical amplifier apparatus. First, FIG. 5 shows the dependency upon a wavelength of gain (a gain wavelength characteristic) of the optical amplifier apparatus according to the invention and the conventional type optical amplifier apparatus.

In the case of the conventional type optical amplifier apparatus, the optical amplifying medium 12 shown in FIG. 1 amplifies a signal light input from the transmission line (a curve A in FIG. 5), the optical equalizer 19 having a loss wavelength characteristic (D) compensates the gain wavelength characteristic and finally, a flattened gain wavelength characteristic (C) of the optical amplifier apparatus is acquired.

In the meantime, in the optical amplifier apparatus according to the invention, as the latter optical amplifying medium 2b compensates the loss of the optical equalizer 1 because the optical equalizer 1 is inserted and arranged between the optical amplifying media 2a and 2b, finally acquired gain is like a curve B in FIG. 5 and higher gain can be realized as a whole, being similarly flattened, compared with the gain of the conventional type.

FIG. 6 shows an example of relationship between pumping light and optical output power after optical amplification in the optical amplifier apparatus according to the invention and the conventional type optical amplifier apparatus. When the required optical output power of the optical amplifier apparatus is equal, high pumping optical power shown as a curve F is required in the conventional type optical amplifier apparatus, however, in the optical amplifier apparatus according to the invention, required optical output power can be acquired with low pumping optical power shown as a curve E. Therefore, in the optical amplifier apparatus according to the invention, optical output equivalent to that in the conventional type can be realized with lower pumping power and higher optical output power than that in the conventional type can be acquired with the same pumping power.

Next, the other embodiments of the invention will be described.

Figure 3:
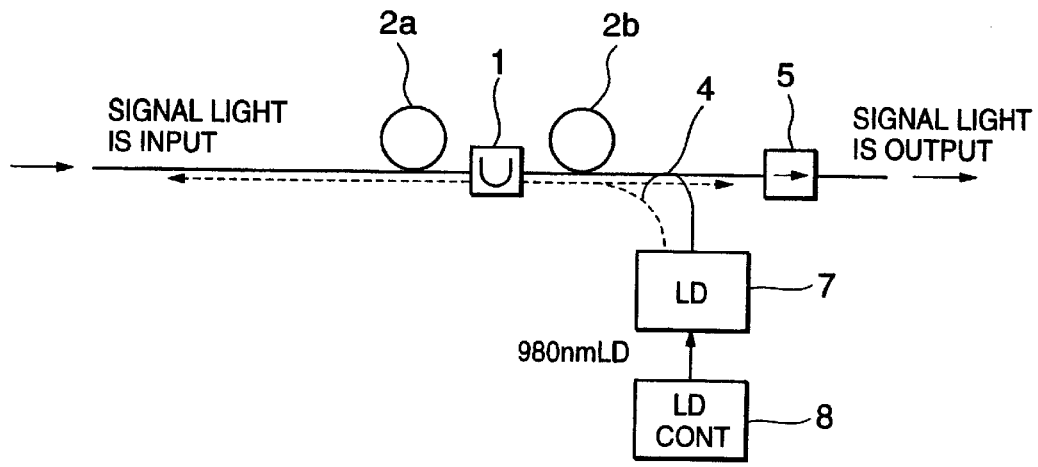
FIG. 3 shows the configuration of a second embodiment of the optical amplifier apparatus according to the invention.

FIG. 3 shows the configuration of a second embodiment of the optical amplifier apparatus according to the invention. In this embodiment, pumping light output from a pumping light source 7 having a wavelength of 0.98 μm is incident after an optical amplifying medium by a wavelength division multiplexing coupler 4 arranged after the optical amplifying medium 2b. Though bi-directional pumping is performed in the first embodiment, rear pumping is performed in this embodiment and the similar effect can be acquired.

Figure 4:
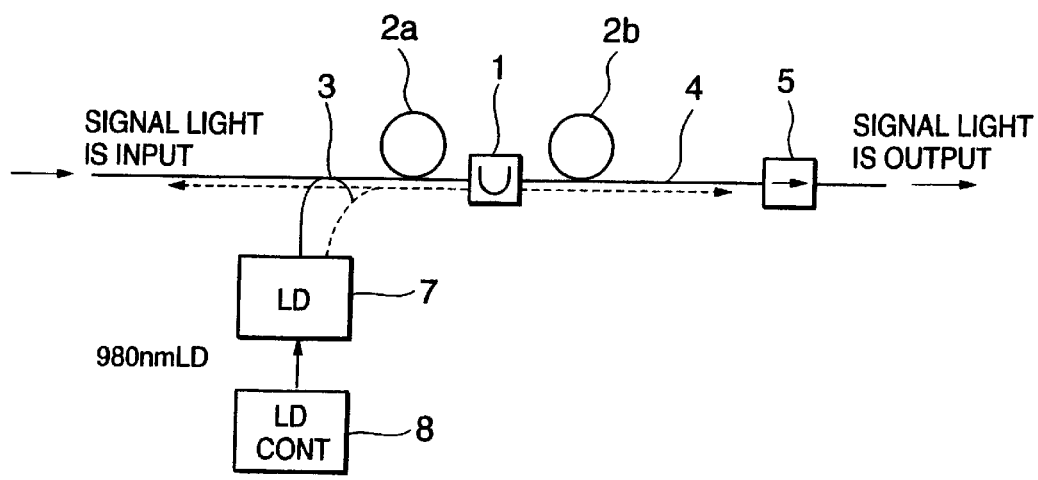
FIG. 4 shows the configuration of a third embodiment of the optical amplifier apparatus according to the invention.

FIG. 4 shows the configuration of a third embodiment of the optical amplifier apparatus according to the invention. In this embodiment, pumping light output from a pumping light source 7 having a wavelength of 0.98 μm is incident before an optical amplifying medium 2b, however, in this configuration, the similar effect can be also acquired.

While this invention has been described in connection with certain preferred embodiments, it is to be understood that the subject matter encompassed by way of this invention is not to be limited to those specific embodiments. On the contrary, it is intended for the subject matter of the invention to include all alternatives, modification and equivalents as can be included within the spirit and scope of the following claims.

What is claimed is:

1. An optical amplifier apparatus, comprising:
   a first optical amplifying medium that amplifies an input signal light and outputs a first amplified signal light;
   a second optical amplifying medium connected to the first optical amplifying medium in series for amplifying the input first amplified signal light and outputting a second amplified signal light;
   an optical equalizer arranged between the first optical amplifying medium and the second optical amplifying medium;
   pumping light sources that respectively output pumping light for pumping the first optical amplifying medium and the second optical amplifying medium; and
   a wavelength division multiplexing coupler arranged on either a side to which the signal light is input to the first optical amplifying medium or a side from which the second amplified signal light is output from the second optical amplifying medium for inputting the pumping light to the first optical amplifying medium or the second optical amplifying medium,
   wherein said optical equalizer has the dependency upon a wavelength of loss that compensates the dependency upon a wavelength of gain generated when the signal light is amplified by the first optical amplifying medium and the second optical amplifying medium, and
   wherein said optical equalizer includes a grating fiber having a cutoff wavelength shorter than a wavelength of said output pumping light such that no mode transformation of said pumping light occurs.

2. An optical amplifier apparatus according to claim 1, wherein:
   said first optical amplifying medium and said second optical amplifying medium both include an erbium-doped fiber;
   said pumping light has a wavelength of 0.98 $\mu$m; and
   said optical equalizer includes a fiber grating optical equalizer the cutoff wavelength of which is 0.97 $\mu$m or less.

3. An optical amplifier apparatus according to claim 1, comprising:
   a gain control circuit that controls the output of said pumping light so that the gain of said second amplified signal light is a predetermined value.

4. An optical amplifier apparatus according to claim 2, comprising:
   a gain control circuit that controls the output of said first pumping light and said second pumping light so that the gain of said second amplified signal light is a predetermined value.

5. The optical amplifier apparatus according to claim 1, wherein said grating fiber comprises an optical fiber.

6. An optical amplifier apparatus, comprising:
   a first optical amplifying medium that amplifies an input signal light and outputs a first amplified signal light;
   a second optical amplifying medium connected to the first optical amplifying medium in series for amplifying the input first amplified signal light and outputting a second amplified signal light;
   an optical equalizer arranged between the first optical amplifying medium and the second optical amplifying medium;
   a first pumping light source that outputs first pumping light for pumping the first optical amplifying medium and the second optical amplifying medium;
   a first wavelength division multiplexing coupler arranged on a side to which the signal light is input to the first optical amplifying medium for inputting the first pumping light to the first optical amplifying medium;
   a second pumping light source that outputs second pumping light for pumping the first optical amplifying medium and the second optical amplifying medium; and
   a second wavelength division multiplexing coupler arranged on a side from which the second amplified signal light is output from the second optical amplifying medium for inputting the second pumping light to the second optical amplifying medium,
   wherein said optical equalizer has the dependency upon a wavelength of loss that compensates the dependency upon a wavelength of gain generated when the signal light is amplified by the first optical amplifying medium and the second optical amplifying medium,
   wherein said optical equalizer includes a grating fiber optical equalizer having a cutoff wavelength shorter than a wavelength of said first pumping light and said second pumping light such that no mode transformation of said pumping light occurs.

7. An optical amplifier apparatus according to claim 6, wherein:
   said first optical amplifying medium and said second optical amplifying medium both include an erbium-doped fiber;
   at least either of said first pumping light or said second pumping light has a wavelength of 0.98 $\mu$m; and
   said optical equalizer includes a fiber grating optical equalizer the cutoff wavelength of which is 0.97 $\mu$m or less.

8. An optical amplifier apparatus according to claim 6, comprising:
   a gain control circuit that controls the output of said first pumping light and said second pumping light so that the gain of said second amplified signal light is a predetermined value.

9. The optical amplifier apparatus according to claim 6, wherein said grating fiber optical equalizer comprises an optical fiber.

* * * * *